United States Patent [19]
Lee

[11] Patent Number: 5,717,472
[45] Date of Patent: Feb. 10, 1998

[54] POLARIZING PRISM FOR PANEL TYPE LIQUID CRYSTAL DISPLAY FRONT PROJECTOR AND OPTICAL SYSTEM USING THE POLARIZING PRISM

[75] Inventor: Jong Jin Lee, Seoul, Rep. of Korea

[73] Assignee: Hyundai Electronics Industries Co., Ltd., Kyounki-do, Rep. of Korea

[21] Appl. No.: 620,015

[22] Filed: Mar. 21, 1996

[30] Foreign Application Priority Data

Apr. 18, 1995 [KR] Rep. of Korea ............. 95-9085

[51] Int. Cl.⁶ ............................................. G02F 1/1335
[52] U.S. Cl. ............................................. 349/9; 349/5
[58] Field of Search ............... 349/9, 5, 57; 359/831

[56] References Cited

U.S. PATENT DOCUMENTS

| | | | |
|---|---|---|---|
| 4,653,867 | 3/1987 | Urabe et al. | 349/57 |
| 5,283,600 | 2/1994 | Imai | 353/34 |
| 5,381,278 | 1/1995 | Shigaki et al. | 349/9 |
| 5,387,991 | 2/1995 | Mitsutake et al. | 349/9 |
| 5,446,510 | 8/1995 | Mitsutake et al. | 349/5 |
| 5,461,500 | 10/1995 | Tsuji et al. | 349/9 |
| 5,519,518 | 5/1996 | Watanabe et al. | 349/57 |
| 5,590,942 | 1/1997 | Kimura et al. | 349/5 |

Primary Examiner—William L. Sikes
Assistant Examiner—Tiep H. Nguyen
Attorney, Agent, or Firm—Fish & Richardson P.C.

[57] ABSTRACT

A polarizing element used for LCD projectors or LCD monitors, which includes a polarized beam separating and composing prism and either a twisted nematic (TN) liquid crystal or an ½ or ¼ wavelength plate, thereby being capable of not only doubling the efficiency of the light source, but also obtaining a uniform intensity of light. The polarized beam separating and composing prism serves to transmit light beams being parallel to the polarization direction of the polarizer therethrough while shielding light beams being non-parallel to the polarization direction of the polarizer. With such a construction, it is possible to double the light efficiency while using the same light source. Where the polarizing element is applied to an optical system, certain elements of the optical system such as a reflecting mirror and condenser lens can have a reduced size which corresponds to ½ of the size of each LCD panel. Accordingly, it is possible to achieve an easy design and a uniformness in the intensity of composed light beams resulting in an increase in light efficiency.

10 Claims, 5 Drawing Sheets

POLARIZING PRISM FOR PANEL TYPE LIQUID CRYSTAL DISPLAY FRONT PROJECTOR AND OPTICAL SYSTEM USING THE POLARIZING PRISM

BACKGROUND OF THE INVENTION

1. Field of the Invention

The present invention relates to a polarizing element adapted to be used for liquid crystal display (LCD) projectors or monitors, and more particularly to such a polarizing element capable of not only doubling the efficiency of the light source, but also obtaining a uniform intensity of light by use of a polarized beam separating and composing prism and either a twisted nematic (TN) liquid crystal, ½ wavelength plate or ¼ wavelength plate. Such a polarizing element is very useful for LCD projectors or monitors which use polarized beams.

2. Description of the Prior Art

As well known in the art, liquid crystal is a material exhibiting a neutral property between the liquid and solid because it has both the flowability of the liquid and the optical property of the crystal. When such a liquid crystal is subjected to an electric field or heat, its Optical anisotropy varies. Generally, liquid crystals, which exhibit an optical anisotropy, are classified into three kinds, namely, nematic, cholesteric, and smectic. The nematic and cholesteric liquid crystals are being practically used in present display units.

Although such liquid crystals may vary in their optical anisotropy in accordance with a variation in their temperature, they, in most cases, vary their molecular arrangements when being subjected to an electric field, thereby varying optical properties. Typical methods for applying an electric field to liquid crystals include a method using a dynamic scattering mode and a method using a field effect mode.

Display methods using such liquid crystals are practically used because they have the advantages of low power consumption, low material cost, a non-limitation on size and shape, an increased visibility at a brighter place, and a color display.

Referring to FIG. 1, the structure of a general LCD panel is illustrated.

As shown in FIG. 1, the structure includes a polarizer 1 for transmitting light beams being parallel to the polarization direction thereof therethrough while shielding light beams being non-parallel to the polarization direction, a liquid crystal 2 radiated with the light beams emerging from the polarizer 1, and a photo detector 3 for forming an image from the light beams radiated onto the liquid crystal 2 in accordance with a video control signal applied to the liquid crystal 2.

Two kinds of conventional optical systems for color composing LCD projectors have been known. One is an optical system for color composing mirror type LCD projectors which is illustrated in FIG. 2, whereas the other is an optical system for color composing prism type LCD projectors which is illustrated in FIG. 3.

As shown in FIG. 2, the optical system for color composing mirror type LCD projectors includes a light source 11, a reflecting mirror 12, a condenser lens 13, a blue color filter 14-B, a green color filter 14-G, a red color mirror 15-R, a blue color LCD panel 16-B, a green color LCD panel 16-G, a red color LCD panel 16-R, a blue/green color composing mirror 17-BG, a blue/green/red color composing mirror 17-BRG, and a projecting lens system 20.

In the optical system for conventional color composing mirror type LCD projectors, white light beams emitted from the light source 11 are collimated by the reflecting mirror 12 and condenser lens 13. The resultant light then enters the blue color filter 14-B which, in turn, reflects the blue color component of the incident light while transmitting the green and red color components of the light therethrough. The reflected blue color component of the light reflects from the blue color mirror 15-B and then enters the blue color LCD panel 16-B, thereby forming a corresponding blue color image. The green and red color components enter the green and red color LCD panels 16-G and 16-R in a manner similar to that for the blue color component, thereby forming green and red color images, respectively. The green color image is then composed with the blue color image by the blue/green color composing mirror 17-BG. The resultant color image is then composed with the red color image by the blue/green/red color composing mirror 17-BRG. The resultant color image is then projected through the projecting lens system 20.

On the other hand, the optical system for color composing prism type LCD projectors, which is illustrated in FIG. 3, includes a light source 11, a reflecting mirror 12, a condenser lens 13, a blue color filter 14-B, a green color filter 14-G, a blue mirror 15-B, a first red color mirror 15-R-1, a second red color mirror 15-R-2, a blue color LCD panel 16-B, a green color LCD panel 16-G, a red color LCD panel 16-R, a blue/green/red color composing prism 18, and a projecting lens system 20.

Since the optical system for conventional color composing prism type LCD projectors operates in the same manner as the optical system for conventional color composing mirror type LCD projectors shown in FIG. 2, no description will be made for its operation.

In both types of conventional LCD projectors, there is a problem that the light source has a low light efficiency equal to 50% or below because each LCD panel uses a polarizing plate.

In order to solve this problem, a polarizing element using prisms has been proposed. Such a polarizing element is disclosed in Japanese Patent Publication No. 63-182987 and illustrated in FIG. 4.

In such a polarizing element which uses prisms, white light is incident on a red color polarizing prism which, in turn, reflects an S beam of red color, Rs1, while transmitting the remaining light beams including a P beam of red color, Rp, a beam of green color and a beam of blue color therethrough. The light beams transmitted through the red color polarizing prism then transmit through a TN liquid crystal which, in turn, rotates the polarized direction of the beams through an angle of 90°. As a result, the P beam of red color, Rp, emerging from the TN liquid crystal is converted into an S beam of red color, Rs2, which is, in turn, reflected by another red color polarizing prism. Both the S beams Rs1 and Rs2 reflected from the red color polarizing prisms enter a red color LCD panel. The remaining light beams (namely, those of green and blue colors) are incident on associated LCD panels, respectively, after passing through paths similar to that of the red color beams. Thus, the polarizing element of FIG. 4 utilizes both S and P beams of the incident light. However, this polarizing element has the following problems:

First, since the green color beam transmits through the red color polarizing prism and TN liquid crystal, and the blue color beam transmits through the red and green color polarizing prism and TN liquid crystal, loss of light occurs when the light transmits the prisms and TN liquid crystal.

Second, since the light beams Rs1, Gs1 and Bs1 directly radiated onto respective LCD panels have an intensity different from that of the light beams Rs2, Gs2 and Bs2 radiated onto the LCD panels after being polarized, the brightness of the picture is non-uniform, thereby causing the picture quality to be degraded.

SUMMARY OF THE INVENTION

Therefore, an object of the invention is to solve the above-mentioned problems encountered in the prior art and to provide a polarizing element capable of not only utilizing waste light by use of a polarizing prism adapted to separate a polarized beam from incident light and either a TN liquid crystal, ½ wavelength plate or ¼ wavelength plate adapted to rotate the polarized direction of the incident light through an angle of 90°, thereby increasing the efficiency of the light source, but also obtaining a uniform light intensity between the beam directly radiated onto an LCD panel and the beam polarized and then radiated onto the LCD panel by use of polarized beam splitting prisms (50:50).

In accordance with the present invention, this object is accomplished by providing a polarizing prism for a panel type LCD front projector, comprising: a polarized beam separating prism having a first surface for receiving a non-polarized light beam emitted from a light source and collimated into a parallel beam by a reflecting mirror, a second surface being an incidence surface coated with a polarized beam separating coating for separating the incident light into longitudinal and transverse beams (P1 and P2) in such a manner that the transverse beam (P2) parallel to the second surface reflects from the second surface while the longitudinal beam (P1) perpendicular to the second surface transmits through the second surface, a third surface for reflecting the transverse beam reflected from the second surface, a fourth surface for reflecting the transverse beam reflected from the third surface, beam converting means for rotating the polarized direction of the transverse beam reflected from the fourth surface through an angle of 90°, thereby converting it into a longitudinal beam, a fifth surface for receiving the longitudinal beam transmitted through the second surface and the longitudinal beam emerging from the twisted nematic liquid crystal, the fifth surface being coated with a coating for splitting each incident, longitudinal beam into beams at a ratio of 50:50, a sixth surface for reflecting 50% of the longitudinal beam ((½)P1) transmitted through the second surface and then reflected by the fifth surface and 50% of the longitudinal beam ((½)P2) transmitted through the liquid crystal and then transmitted through the fifth surface, a seventh surface for radiating the remaining 50% of the longitudinal beam ((½)P1) transmitted through the second surface and then transmitted through the fifth surface and the remaining 50% of the longitudinal beam ((½)P2) transmitted through the liquid crystal and then reflected by the fifth surface onto a color filter, and an eighth surface for radiating the light beam reflected from the sixth surface onto the color filter, whereby light beams respectively passing through the seventh and eighth surfaces have an intensity of (½)P1+(½)P2; a triangular prism for receiving the light beam transmitted through the second surface of the polarized beam separating prism and transmitting it to the fifth surface of the polarized beam separating prism; and the beam converting means comprising either a twisted nematic liquid crystal or an ½ wavelength plate.

BRIEF DESCRIPTION OF THE DRAWINGS

Other objects and aspects of the invention will become apparent from the following description of embodiments with reference to the accompanying drawings in which.

DETAILED DESCRIPTION OF THE PREFERRED EMBODIMENTS

Figure 5:
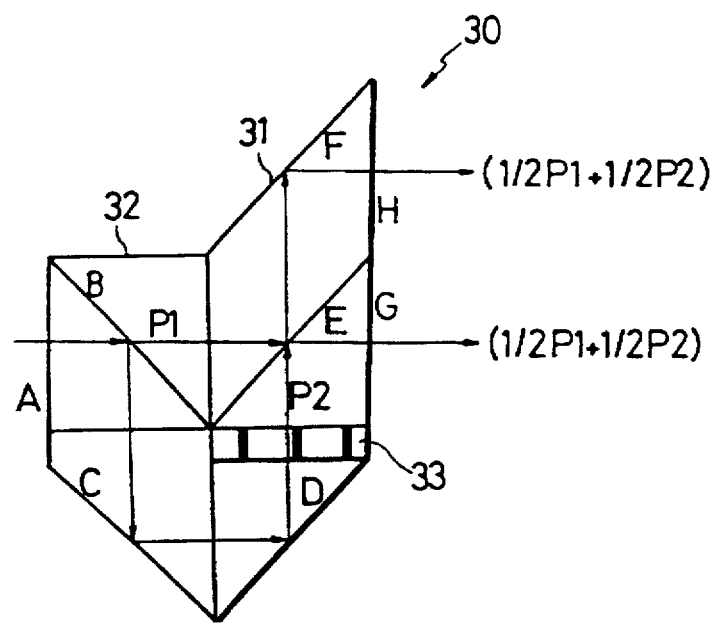
FIG. 5 is a schematic view illustrating a polarized beam separating and composing prism is illustrated, which uses a TN liquid crystal or ½ wavelength plate in accordance with an embodiment of the present invention.

Referring to FIG. 5, a polarized beam separating and composing prism is illustrated, which uses a TN liquid crystal or ½ wavelength plate in accordance with an embodiment of the present invention.

As shown in FIG. 5, the polarizing prism, which is denoted by the reference numeral 30, includes a triangular prism 31, a polarized beam separating prism 32 coated with a polarized beam separating coating, and a TN liquid crystal or ½ wavelength plate 33 all being integral with one another. A non-polarized beam emitted from a light source is incident on a surface A of the polarizing prism 30 after being collimated into a parallel beam by a reflecting mirror. The incident light is then arrived at a surface B of the polarizing prism 30 which is an incidence surface coated with a polarized beam separating coating for separating the incident light into transverse and longitudinal beams. The transverse beam parallel to the surface B reflects from the surface B whereas the longitudinal beam perpendicular to the surface B transmits through the surface B. The transmitted longitudinal beam P1 then reaches a surface E of the polarizing prism 30 which is coated with a coating for splitting the incident beam into beams at a ratio of 50:50. 50% of the incident beam P1 ((½)P1) transmits through the surface E and then radiates onto a color filter (not shown) after emerging from a surface G of the polarizing prism 30. The remaining 50% of the beam P1 ((½)P1) reflects from the surface E and then reaches a surface F of the polarizing prism 30. The beam arrived at the surface F reflects from the surface F and then radiates onto the color filter after emerging from a surface H of the polarizing prism 30.

On the other hand, the transverse beam S2 reflected from the surface B sequentially reflects from surfaces C and D of the polarizing prism 30 and then enters the TN liquid crystal which serves to rotate the polarized direction of the incident beam through an angle of 90°. As a result, the transverse beam S2 is converted into a longitudinal beam P2. This beam P2 then reaches the surface E which is coated with the coating for splitting the incident beam into beams at a ratio of 50:50. 50% of the incident beam P2 ((½)P2) reflects from the surface E and then radiates onto the color filter after emerging from the surface G of the polarizing prism 30. The remaining 50% of the beam P2 ((½)P2) transmits through surface E and then reaches the surface F. The beam arrived at the surface F reflects from the surface F and then radiates onto the color filter after emerging from the surface H.

Thus, both the light beams respectively passing through the surfaces G and H have an intensity of ((½)P1+(½)P2).

Figure 6:
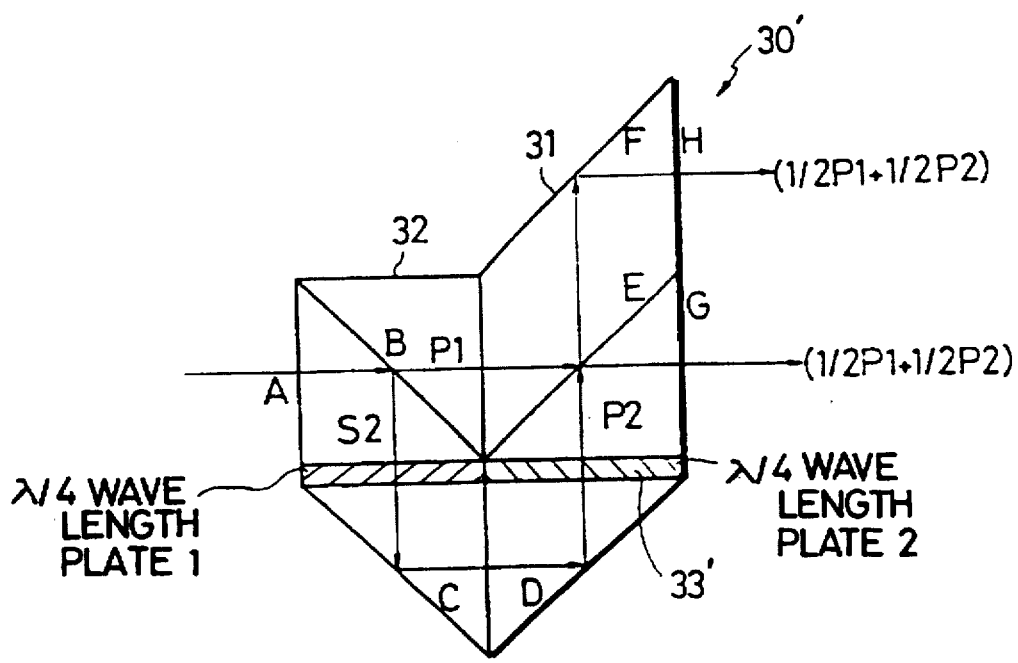
FIG. 6 is a schematic view illustrating a polarized beam separating and composing prism is illustrated, which uses an ¼ wavelength plate in accordance with another embodiment of the present invention.

Referring to FIG. 6, a polarized beam separating and composing prism is illustrated, which uses an ¼ wavelength plate in accordance with another embodiment of the present invention. In FIG. 6, elements respectively corresponding to those in FIG. 5 are denoted by the same reference numerals.

As shown in FIG. 6, the polarizing prism, which is denoted by the reference numeral 30', includes a triangular prism 31, a polarized beam separating prism 32 coated with a polarized beam separating coating, and an ¼ wavelength plate 33' all being integral with one another. A non-polarized beam emitted from a light source is incident on a surface A of the polarizing prism 30' after being collimated into a parallel beam by a reflecting mirror. The incident light is then arrived at a surface B of the polarizing prism 30' which is an incidence surface coated with a polarized beam separating coating for separating the incident light into transverse and longitudinal beams. The transverse beam parallel to the surface B reflects from the surface B whereas the longitudinal beam perpendicular to the surface B transmits through the surface B. The transmitted longitudinal beam P1 then reaches a surface E of the polarizing prism 30' which is coated with a coating for splitting the incident beam into beams at a ratio of 50:50. 50% of the incident beam P1 ((½)P1) transmits through the surface E and then radiates onto a color filter (not shown) after emerging from a surface G of the polarizing prism 30'. The remaining 50% of the beam P1 ((½)P1) reflects from the surface E and then reaches a surface F of the polarizing prism 30'. The beam arrived at the surface F reflects from the surface F and then radiates onto the color filter after emerging from a surface H of the polarizing prism 30'.

On the other hand, the transverse beam (linearly polarized beam) S2 reflected from the surface B enters an ¼ wavelength plate 1, which constitutes part of the ¼ wavelength plate 33' and serves to rotate the polarized direction of the incident beam through 45°, thereby producing a circularly polarized beam. As a result, the transverse beam S2 is converted into a circularly polarized beam which, in turn, sequentially reflects from surfaces C and D of the polarizing prism 30'. The reflected beam then enters another ¼ wavelength plate 2 which also constitutes part of the ¼ wavelength plate 33'. By the ¼ wavelength plate 2, the incident beam is converted into a longitudinal beam P2 (linearly polarized beam). This beam P2 then reaches the surface E which is coated with the coating for splitting the incident beam into beams at a ratio of 50:50. 50% of the incident beam P2 ((½)P2) transmits through the surface E and then radiates onto the color filter after emerging from the surface G of the polarizing prism 30'. The remaining 50% of the beam P2 ((½)P2) reflects from the surface E and then reaches the surface F. The beam arrived at the surface F reflects from the surface F and then radiates onto the color filter after emerging from the surface H.

Thus, both the light beams respectively passing through the surfaces G and H have an intensity of ((½)P1+(½)P2). Accordingly, composed beams, which transmit through the liquid crystal, have a uniform light intensity. In particular, it is possible to utilize polarized beams, which are unusable in conventional optical systems using polarizers and photo detectors, in a rate of 100%, thereby increasing the light efficiency.

Figure 1:
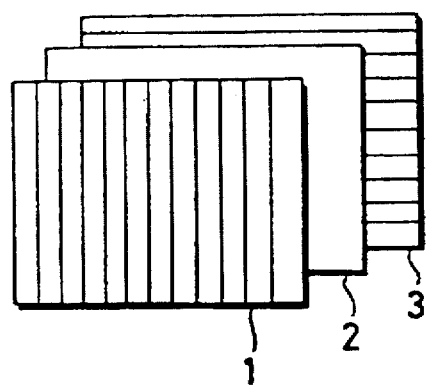
FIG. 1 is an exploded perspective view illustrating a typical LCD panel.
Figure 2:
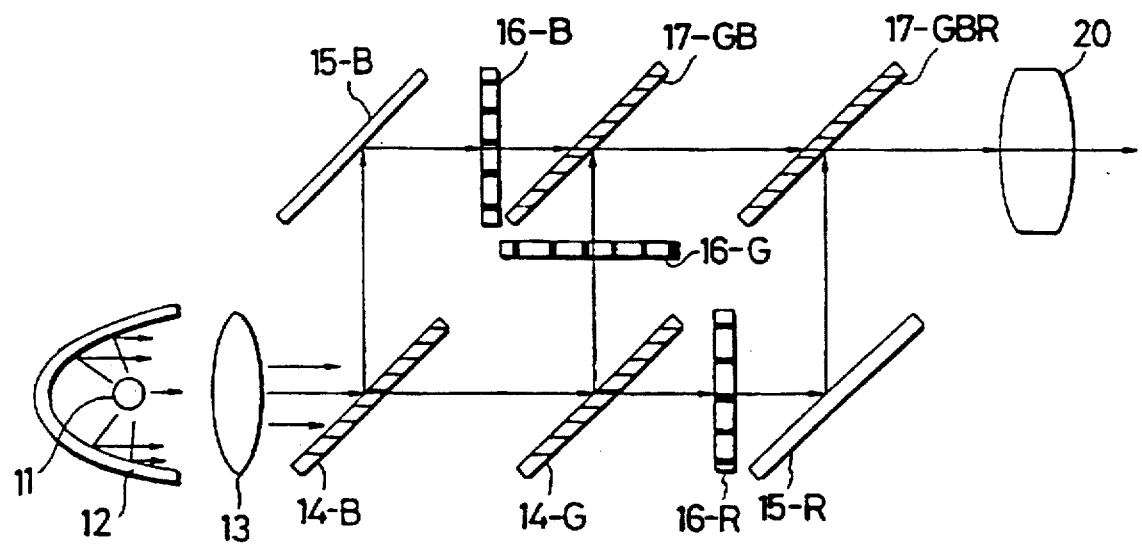
FIG. 2 is a schematic view illustrating an optical system for conventional color composing mirror type LCD projectors.
Figure 3:
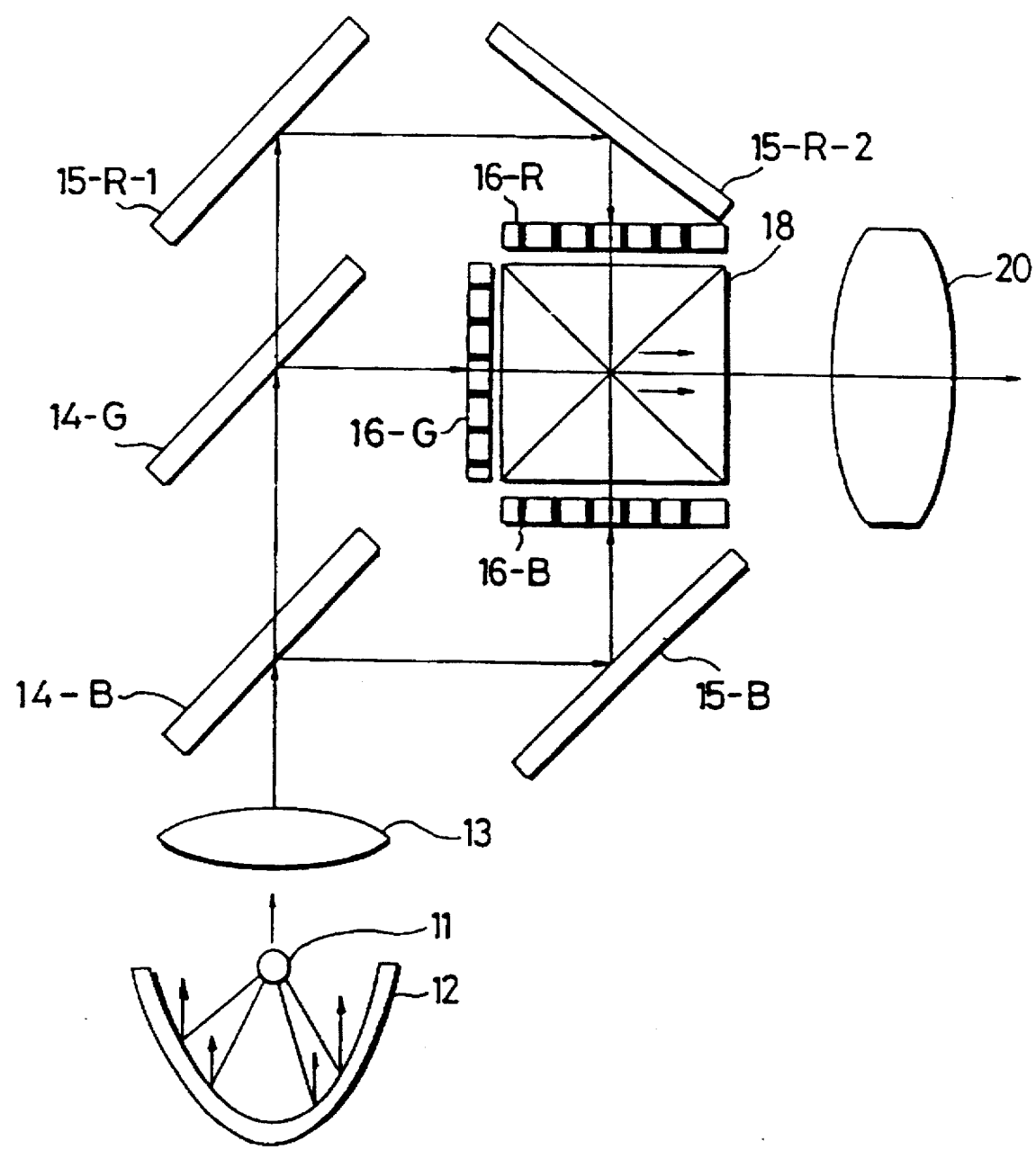
FIG. 3 is a schematic view illustrating an optical system for conventional color composing prism type LCD projectors.
Figure 4:
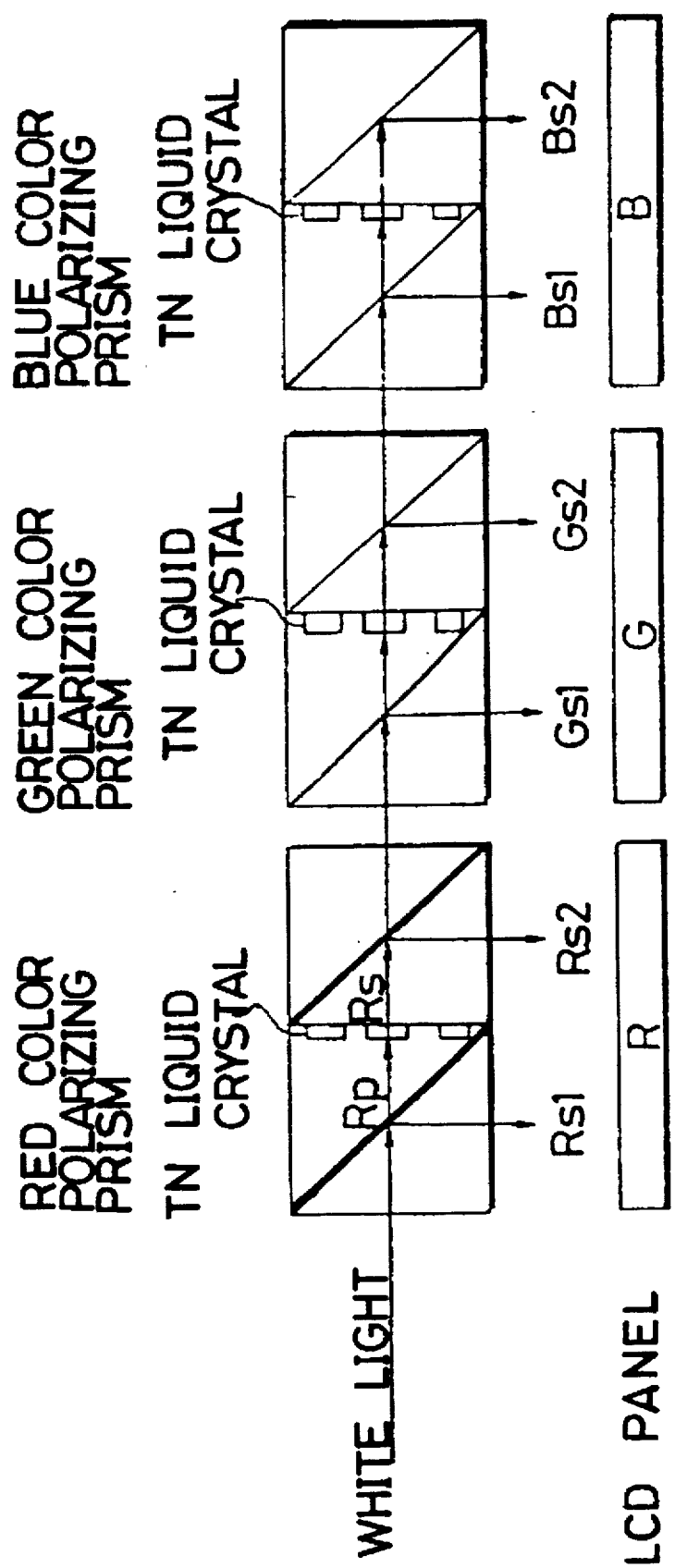
FIG. 4 is a schematic view illustrating a polarizing element using a conventional prism as disclosed in Japanese Patent Publication No. 63-182987.
Figure 7:
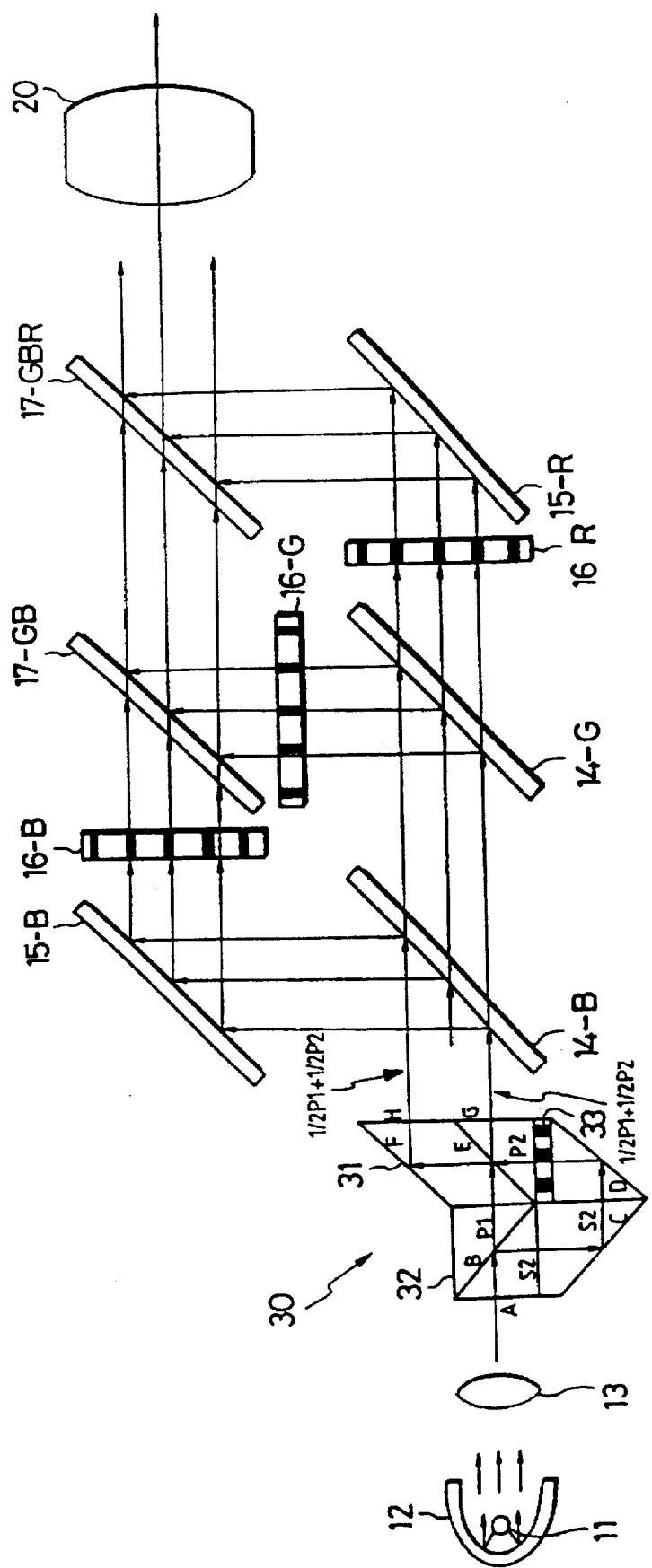
FIG. 7 is a schematic view illustrating a polarizing prism optical system for panel type LCD front projectors in accordance with the present invention.

FIG. 7 illustrates a polarizing prism optical system for panel type LCD front projectors in which its polarized beam separating and composing prism uses a TN liquid crystal or ½ wavelength plate in accordance with the present invention. In FIG. 7, elements respectively corresponding to those in FIG. 2 are denoted by the same reference numerals. As shown in FIG. 7, the optical system includes a light source 11, a reflecting mirror 12, a condenser lens 13, a polarizing prism 30, a blue color filter 14-B, a green color filter 14-G, a blue color mirror 15-B, a red color mirror 15-R, a blue color LCD panel 16-B, a green color LCD panel 16-G, a red color LCD panel 16-R, a blue/green color composing mirror 17-BG, a blue/green/red color composing mirror 17-BRG, and a projecting lens system 20.

In the optical system for panel type LCD front projectors according to the present invention, white light beams emitted from the light source 11 are collimated by the reflecting mirror 12 and condenser lens 13 and then pass through the polarizing prism 30 having the construction of FIG. 5. The light beams emerging from the polarizing prism 30 have an intensity of ((½)P1+(½)P2). The reflecting mirror 12 has a size corresponding to ½ of the size of each LCD panel. The condenser lens 13 also has a size corresponding to ½ of the size of each LCD panel. The light beams are linearly polarized while passing through the polarizing prism 30. By such features, the optical system according to the present invention eliminates the use of polarizers which have been conventionally used in LCD panels.

Since subsequent operations of the optical system are the same as those of the conventional optical system shown in FIG. 2, the description thereof will be omitted.

By virtue of the above-mentioned feature, the polarizing prism can be used for LCD monitors and other optical systems required to have an increased light efficiency as well as for LCD projectors.

As mentioned above, the conventional LCD projectors has the problem that it is difficult to obtain a bright image because the light source has a low light efficiency equal to 50% or below. Although a polarizing element using prisms has been proposed to solve this problem, as disclosed in Japanese Patent Publication No. 63-182987, there is a difference in intensity between the light reflecting from the polarized beam separating surface and the light passing through the liquid crystal and prism. Such an intensity difference results in a degradation in picture quality. Furthermore, this polarizing element exhibits a low light efficiency because green color light beams pass through the red color polarizing prism while blue color light beams pass through the red and green color polarizing prisms, respectively. For applying this polarizing element to optical systems, it is required to use a large number of color separating and composing filters.

In accordance with the present invention, the polarizing prism includes the polarized beam separating and composing prism serving to transmit light beams being parallel to the polarization direction of the polarizer therethrough while shielding light beams being non-parallel to the polarization direction of the polarizer, the 50:50 beam splitter, and either the TN liquid crystal, ½ wavelength plate or ¼ wavelength plate. With such a construction, it is possible to double the light efficiency while using the same light source. Since the reflecting mirror and condenser lens used in the present case have sizes corresponding to half those in conventional cases, respectively, it is possible to achieve an easy design and a uniformness in the intensity of composed light beams resulting in an increase in light efficiency.

Although the preferred embodiments of the invention have been disclosed for illustrative purposes, those skilled in the art will appreciate that various additions and substitutions are possible, without departing from the scope and spirit of the invention as disclosed in the accompanying claims.

What is claimed is:

1. A polarizing prism for a panel type LCD front projector, comprising:

a polarized beam separating prism, beam converting means, and a triangular prism, which in combination provide a first surface for receiving a non-polarized light beam emitted from a light source and collimated into a parallel beam by a reflecting mirror, a second surface being an incidence surface coated with a polarized beam separating coating for separating the incident light into longitudinal and transverse beams in such a manner that the transverse beam with a polarization direction parallel to the second surface reflects from the second surface while the longitudinal beam with a polarization direction perpendicular to the second surface transmits through the second surface, a third surface for reflecting the beam reflected from the second surface, a fourth surface for reflecting the beam reflected from the third surface, the beam converting means for rotating the polarized direction of the beam reflected from the second surface through an angle of 90° prior to being incident on a fifth surface, thereby converting it into a longitudinal beam, the fifth surface for receiving the longitudinal beam transmitted through the second surface and the longitudinal beam transmitted through the beam converting means, the fifth surface being coated with a coating for splitting each incident, longitudinal beam into beams at a ratio of 50:50, a sixth surface for reflecting 50% of the longitudinal beam transmitted through the second surface and then reflected by the fifth surface and 50% of the longitudinal beam transmitted through the beam converting means and then transmitted through the fifth surface, a seventh surface for radiating the remaining 50% of the longitudinal beam transmitted through the second surface and then transmitted through the fifth surface and the remaining 50% of the longitudinal beam transmitted through the beam converting mean and then reflected by the fifth surface onto a color filter, and an eighth surface for radiating the light beam reflected from the sixth surface onto the color filter, whereby light beams respectively passing through the seventh and eighth surfaces have equal intensities; and wherein the triangular prism is for receiving the light beam transmitted through the second surface and transmitting it to the fifth surface.

2. The polarizing prism in accordance with claim 1, wherein the 50:50 beam splitting coating is adapted to make the incident light beam have a uniform intensity.

3. The polarizing prism in accordance with claim 1, wherein the beam converting means is positioned so that the beam reflected from the second surface makes a single pass through the beam converting means before being incident on the fifth surface.

4. The polarizing prism in accordance with claim 3, wherein the beam converting means comprises twisted nematic liquid crystals.

5. The polarizing prism in accordance with claim 3, wherein the beam converting means comprises a ½ wavelength plate.

6. The polarizing prism in accordance with claim 3, wherein the beam converting means is located between the fourth surface and the fifth surface.

7. The polarizing prism in accordance with claim 1, wherein the beam converting means is positioned so that the beam reflected from the second surface makes two passes through the beam converting means before being incident on the fifth surface.

8. The polarizing prism in accordance with claim 7, wherein the beam converting means comprises a ¼ wavelength plate.

9. The polarizing prism in accordance with claim 7, wherein the beam converting means is located between the second surface and the third surface and between the fourth surface and the fifth surface.

10. The polarizing prism in accordance with claim 7, wherein the beam converting means is for converting the transverse beam reflected from the second surface into a circularly polarized beam during the first pass and for converting the circularly polarized beam into the longitudinal beam transmitted through the beam converting means during the second pass.

* * * * *